(12) United States Patent
Wu et al.

(10) Patent No.: US 12,346,161 B2
(45) Date of Patent: Jul. 1, 2025

(54) LOCKING DEVICE

(71) Applicants: Hung-Yun Wu, Taipei (TW); Pi-Nan Lee, Taipei (TW); Kai-Chen Tien, Taipei (TW)

(72) Inventors: Hung-Yun Wu, Taipei (TW); Pi-Nan Lee, Taipei (TW); Kai-Chen Tien, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 648 days.

(21) Appl. No.: 17/830,301

(22) Filed: Jun. 1, 2022

(65) Prior Publication Data

US 2023/0121853 A1      Apr. 20, 2023

Related U.S. Application Data

(60) Provisional application No. 63/257,129, filed on Oct. 19, 2021.

(51) Int. Cl.
    *G06F 1/16*        (2006.01)
(52) U.S. Cl.
    CPC .................. *G06F 1/1632* (2013.01)

(58) Field of Classification Search
    CPC ............................ G06F 1/1632; G06F 1/1679
    See application file for complete search history.

(56) References Cited

U.S. PATENT DOCUMENTS

2023/0367374 A1\* 11/2023 Mori ..................... G06F 1/1679

\* cited by examiner

*Primary Examiner* — James Wu
(74) *Attorney, Agent, or Firm* — JCIPRNET (57) ABSTRACT

A locking device includes a base, a hook pivoted to the base to move between an engaging position and a releasing position, a sliding member slidably disposed at the base and locked to the base to maintain the hook at the releasing position, a knob pivoted to the base, and an actuating member slidably disposed at the base. The sliding member slides relative to the base to be disengaged from the hook or to drive the hook to be transported to the releasing position. The knob rotates relative to the base and blocks the sliding member from sliding or allows the sliding member to slide relative to the base. The actuating member receives a force to slide relative to the base and drives the sliding member to be disengaged from the base and moved and disengaged from the hook to allow the hook to be transported to the engaging position.

16 Claims, 13 Drawing Sheets

LOCKING DEVICE

CROSS-REFERENCE TO RELATED APPLICATION

This application claims the priority benefit of U.S. provisional application Ser. No. 63/257,129, filed on Oct. 19, 2021. The entirety of the above-mentioned patent application is hereby incorporated by reference herein and made a part of this specification.

BACKGROUND

Technical Field

The disclosure relates to a locking device; more particularly, the disclosure relates to a locking device applied to a docking device.

Description of Related Art

A two-in-one notebook computer includes a tablet computer and a docking device. Here, a keyboard, a touch panel, or other input modules are disposed on the docking device. When the tablet computer is connected to the docking device, a user may perform input operations on the tablet computer through the docking device. However, if the user is required to install the tablet computer onto the existing docking device or disassemble the tablet computer from the existing docking device, such an action should be done by both hands of the user, which is detrimental to the convenience of use.

SUMMARY

The disclosure provides a locking device with convenience of use.

An embodiment of the disclosure provides a locking device that includes a base, a hook, a sliding member, a knob, and an actuating member. The hook is pivoted to the base to move between an engaging position and a releasing position. The sliding member is slidably disposed at the base to slide relative to the base, so as to be disengaged from the hook or drive the hook to be transported to the releasing position. The sliding member is configured to be locked to the base to maintain the hook at the releasing position. The knob is pivoted to the base to rotate relative to the base and block the sliding member from sliding or allow the sliding member to slide relative to the base. The actuating member is slidably disposed at the base and configured to receive a force to slide relative to the base and drive the sliding member to be disengaged from the base, so that the sliding member is moved and disengaged from the hook to allow the hook to be configured for being transported to the engaging position.

In an embodiment of the disclosure, the locking device further includes a first position restoring member disposed in the base, and both ends of the first position restoring member respectively abut against the base and the actuating member.

In an embodiment of the disclosure, the first position restoring member constantly drives the actuating member to move away from the base.

In an embodiment of the disclosure, the locking device further includes a second position restoring member disposed in the base, and both ends of the second position restoring member are respectively connected to the base and the hook.

In an embodiment of the disclosure, the second position restoring member constantly drives the hook to move to the engaging position.

In an embodiment of the disclosure, the locking device further includes a third position restoring member disposed in the base, and both ends of the third position restoring member respectively abut against the base and the sliding member.

In an embodiment of the disclosure, the third position restoring member constantly drives the sliding member to move to be disengaged from the hook.

In an embodiment of the disclosure, the knob has a stopper part, and the knob is configured to rotate relative to the base, so that the stopper part is located on a moving path of the sliding member to prevent the sliding member from relatively sliding or being located outside the moving path of the sliding member and to allow the sliding member to slide relative to the base.

In an embodiment of the disclosure, the knob has an opening, and the knob is configured to rotate relative to the base, so that the opening is misaligned from the sliding member, and the sliding member is prevented from passing through the opening, whereby the sliding member is prevented from sliding relatively, or the opening is allowed to be aligned to the sliding member, so that the sliding member is allowed to pass through the opening and slide relative to the base.

In an embodiment of the disclosure, the sliding member has a first abutting part, and the first abutting part is configured to abut against the knob, so that the sliding member is restricted from relatively sliding or configured to pass through the knob, whereby the sliding member is allowed to slide relative to the base.

In an embodiment of the disclosure, the sliding member has a second abutting part, and the second abutting part is configured to be disengaged from the hook or drive the hook to the releasing position.

In an embodiment of the disclosure, the hook has a first actuated part, and the first actuated part is configured to be driven by the sliding member to transport the hook to the releasing position.

In an embodiment of the disclosure, the base has a first engaging part, the sliding member has a second engaging part corresponding to the first engaging part, and the second engaging part is configured to be locked to the first engaging part, so that the sliding member is allowed to maintain the hook at the releasing position.

In an embodiment of the disclosure, the base has a first guiding part, the sliding member has a second guiding part corresponding to the first guiding part, and the first guiding part is configured to guide the second guiding part, so that the sliding member is configured to be locked to the base.

In an embodiment of the disclosure, the sliding member has an elastic arm, and the elastic arm is configured to be guided by the base, so that the sliding member is engaged with the base or pushed by the actuating member to disengage the sliding member from the base.

In an embodiment of the disclosure, the actuating member has a pushing part, the sliding member has a second actuated part corresponding to the pushing part, and the actuating member is configured to slide relative to the base, so that the pushing part is allowed to push the second actuated part to disengage the sliding member from the base.

In view of the above, in the locking device provided in one or more embodiments of the disclosure, the hook is pivoted to the base to move between the engaging position and the releasing position, the sliding member is slidably disposed at the base to slide relative to the base, so as to be disengaged from the hook or drive the hook to be transported to the releasing position, and the sliding member is configured to be locked to the base to maintain the hook at the releasing position. The knob is pivoted to the base to rotate relative to the base and block the sliding member from sliding or allow the sliding member to slide relative to the base. The actuating member is slidably disposed at the base, and the actuating member is configured to receive a force to slide relative to the base and drive the sliding member to be disengaged from the base, so that the sliding member is moved and disengaged from the hook to allow the hook to be configured for being transported to the engaging position. When the sliding member is locked to the base, the hook stays at the releasing position, and a user may exert a force to the actuating member, so as to allow the actuating member to drive the sliding member to be disengaged from the base and further allow the hook to be transported to the engaging position. Thereby, the tablet computer may be installed or disassembled with ease, and such an installation or disassembly may be done by the user with use of one single hand, thus ensuring the convenience of use.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF THE EMBODIMENTS

The terms "first," "second," and "third" mentioned in the disclosure merely serve to distinguish different components to facilitate understanding and reading and are not intended to pose any limitation to the disclosure.

Figure 1:
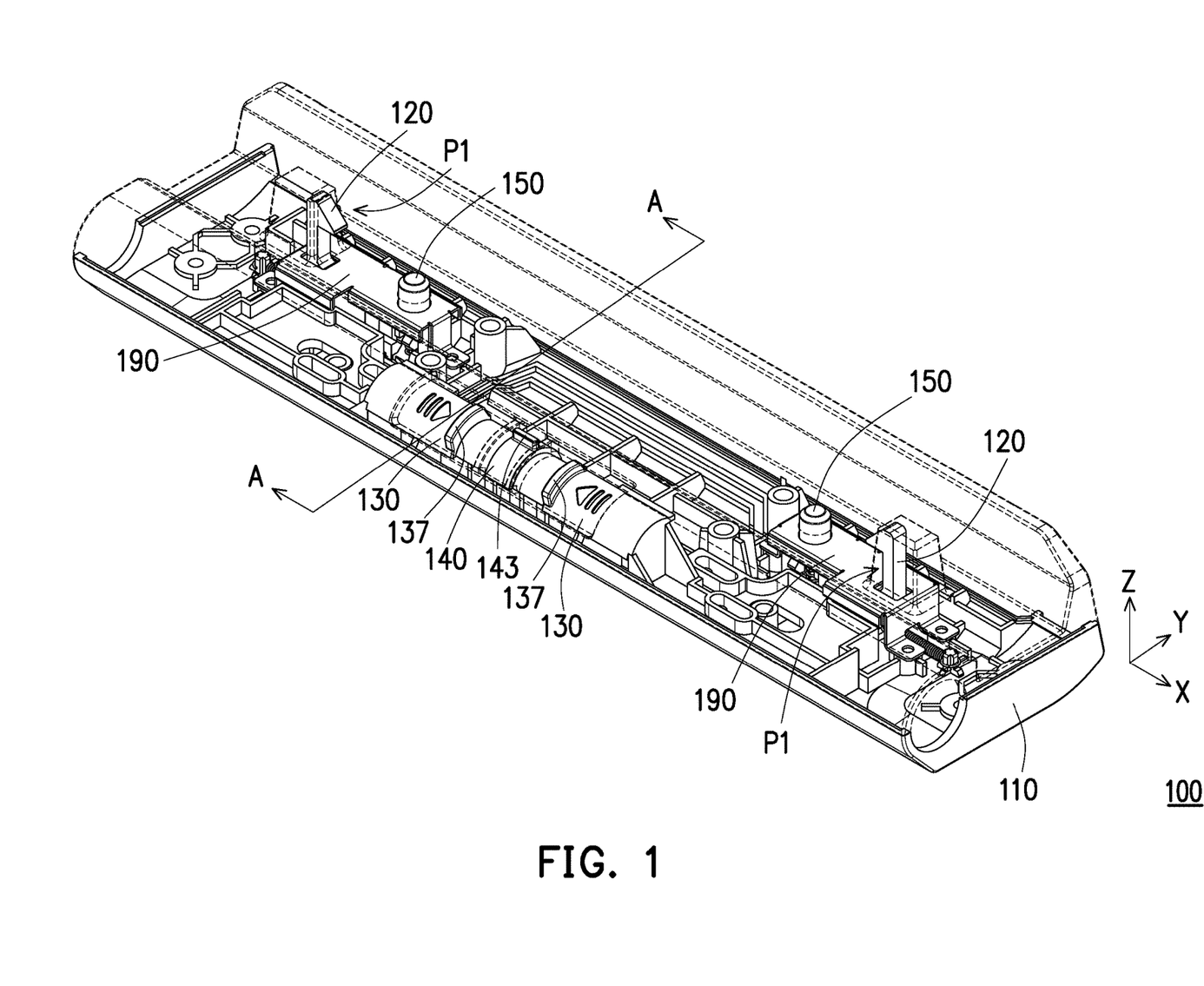
FIG. 1 is a schematic three-dimensional view illustrating a locking device in a first mode according to an embodiment of the disclosure.
Figure 2:
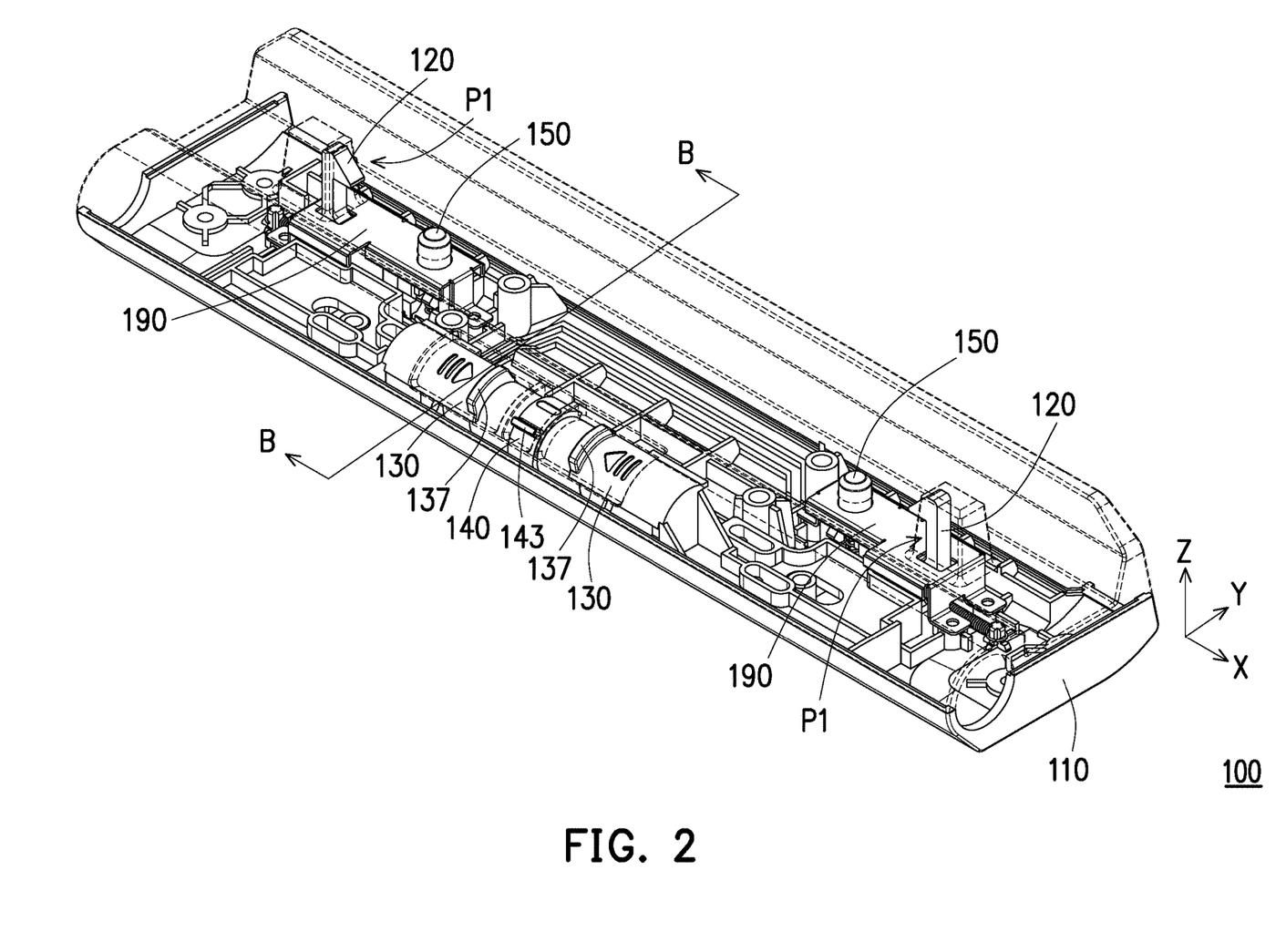
FIG. 2 is a schematic three-dimensional view illustrating the locking device depicted in FIG. 1 in a second mode.
Figure 3:
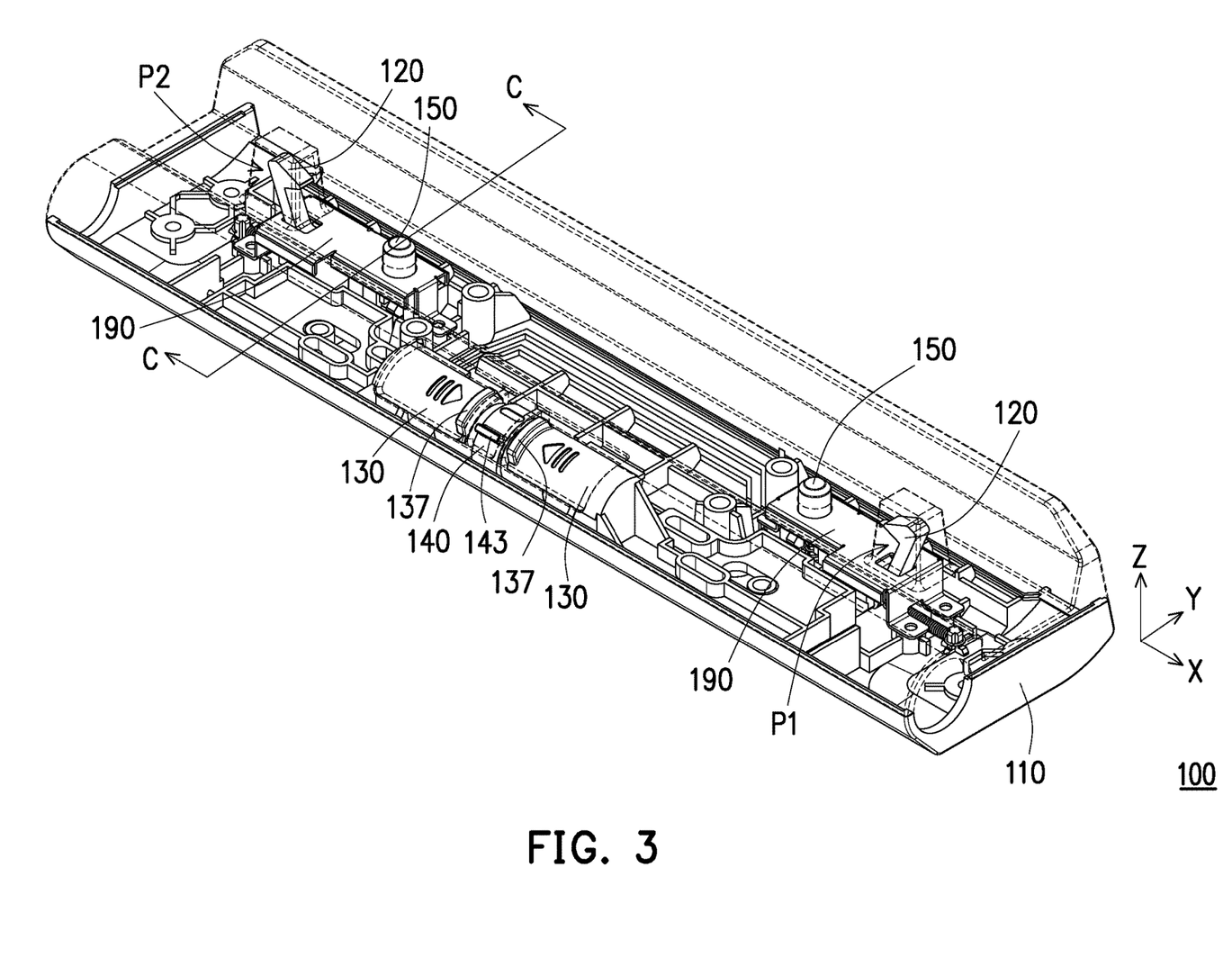
FIG. 3 is a schematic three-dimensional view illustrating the locking device depicted in FIG. 1 in a third mode.
Figure 4:
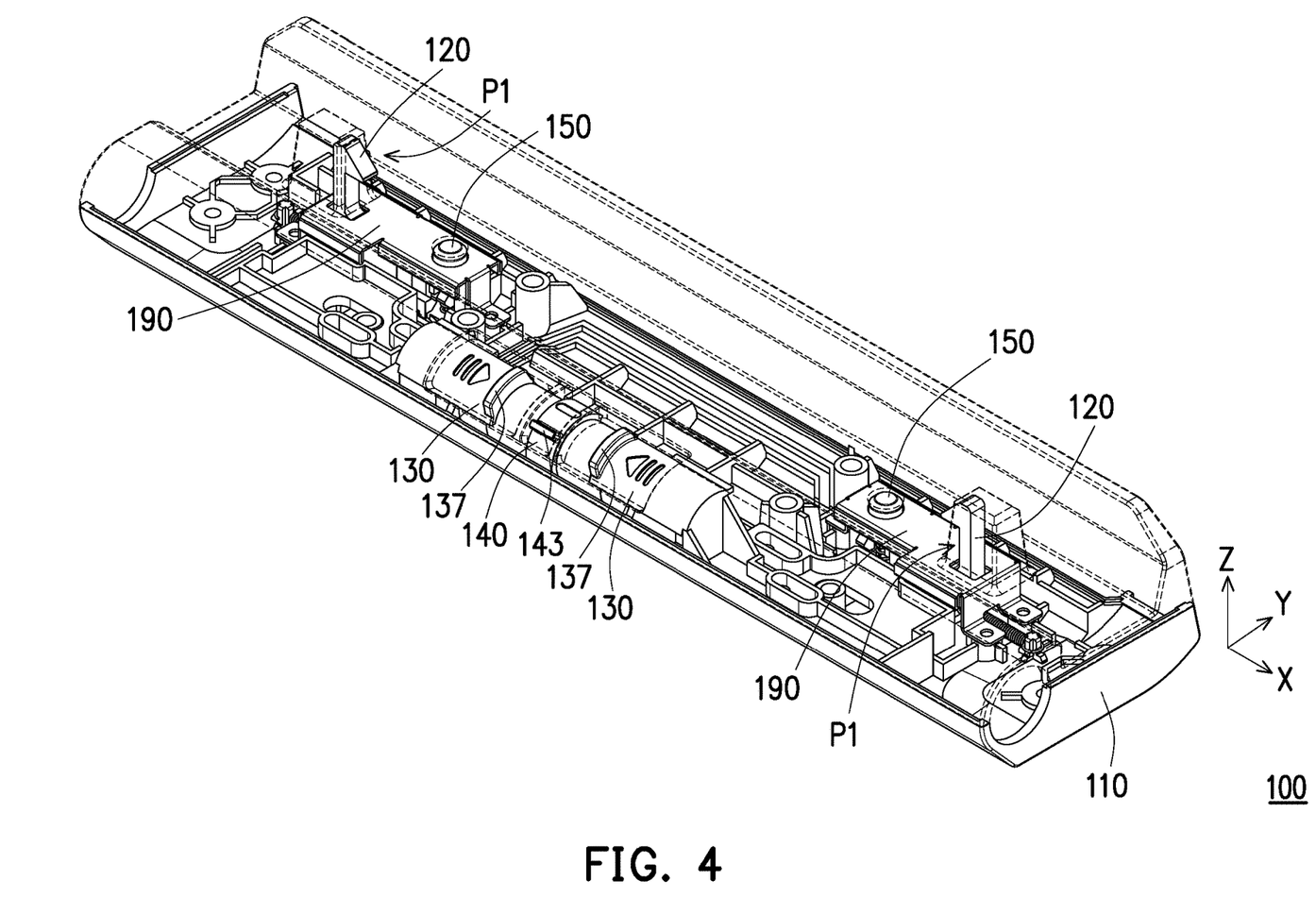
FIG. 4 is a schematic three-dimensional view illustrating the locking device depicted in FIG. 1 in a fourth mode.
Figure 5:
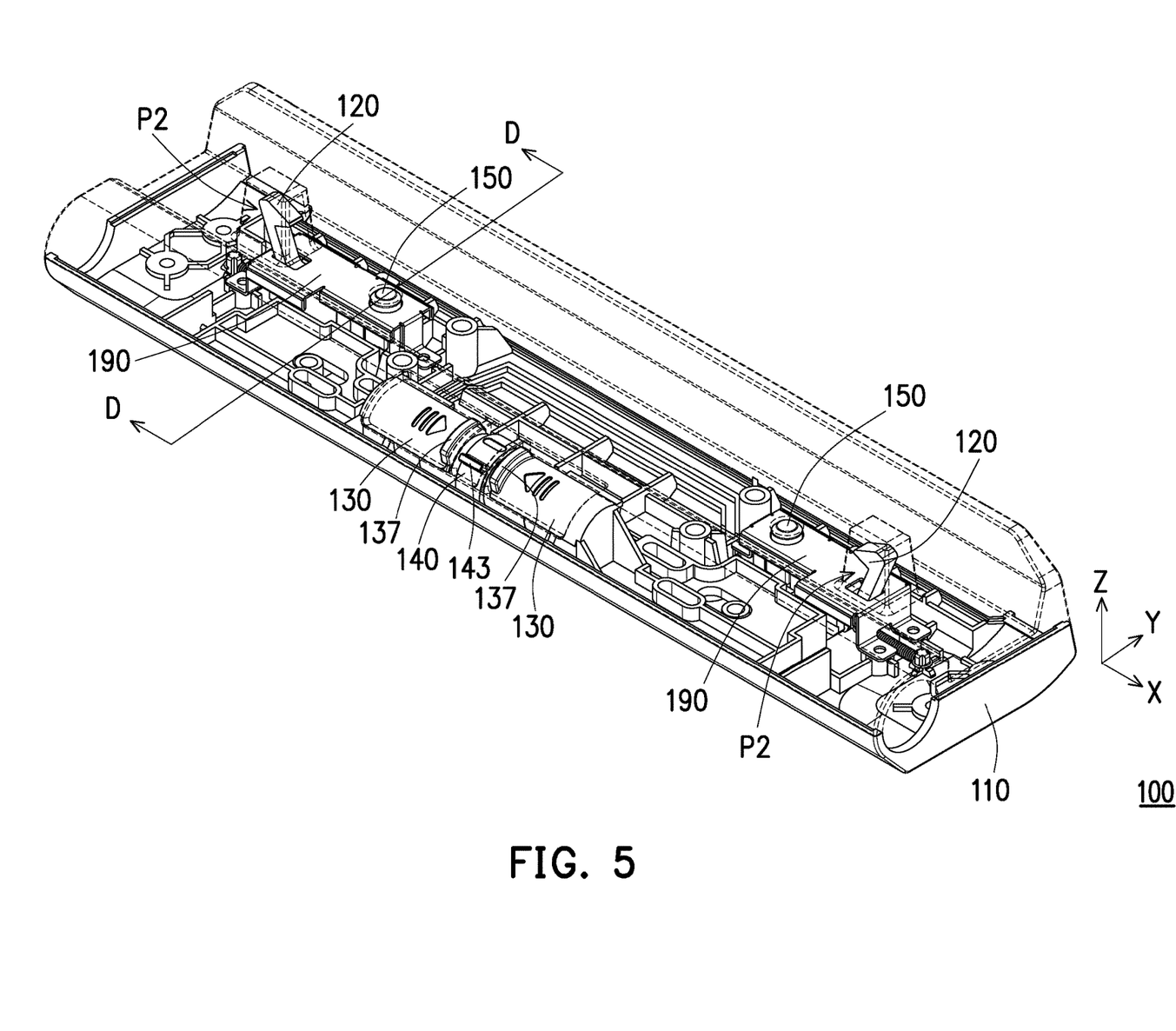
FIG. 5 is a schematic three-dimensional view illustrating the locking device depicted in FIG. 1 in a fifth mode.
Figure 6:
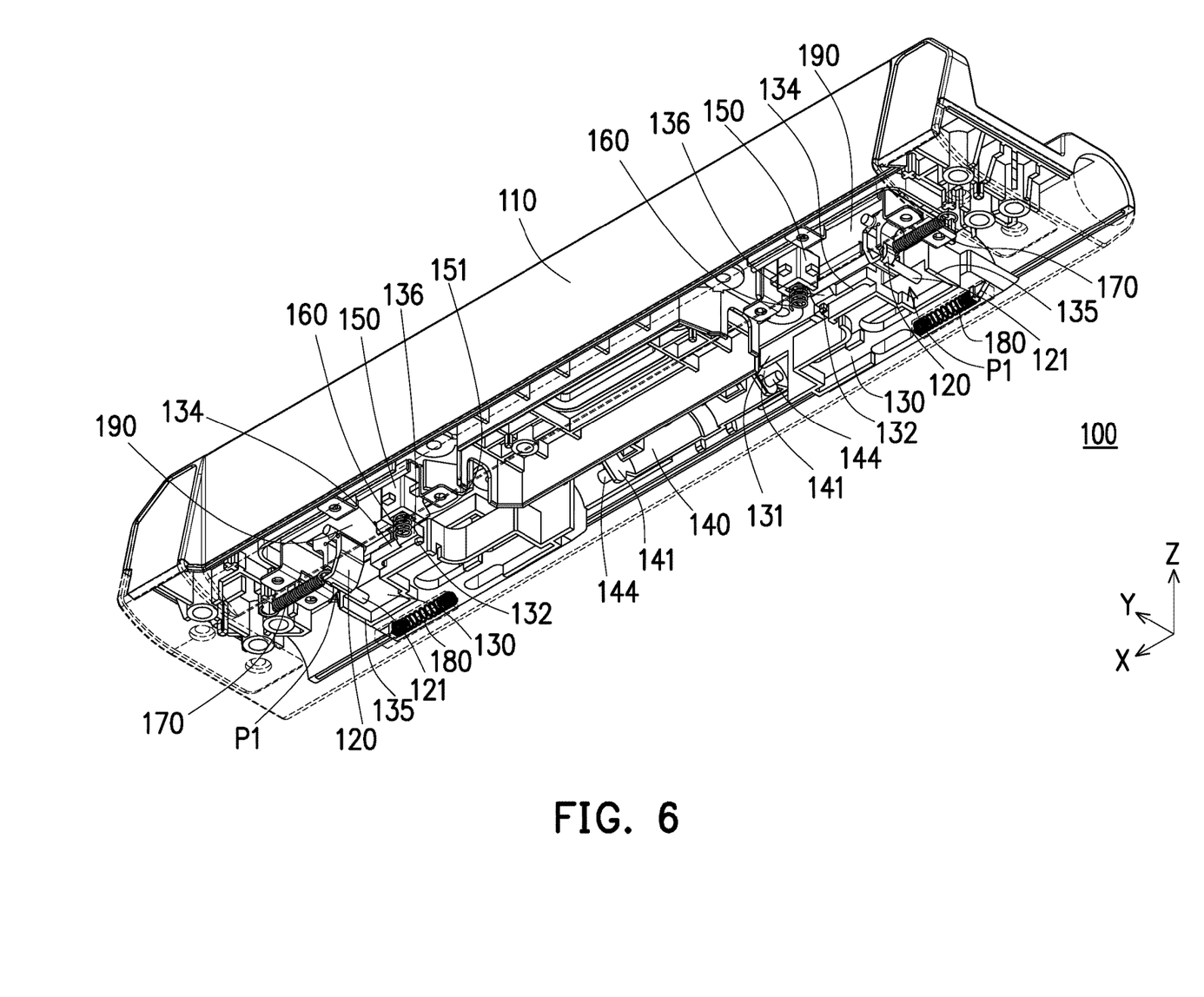
FIG. 6 is a schematic three-dimensional view illustrating the locking device depicted in FIG. 1 at another viewing angle.
Figure 7:
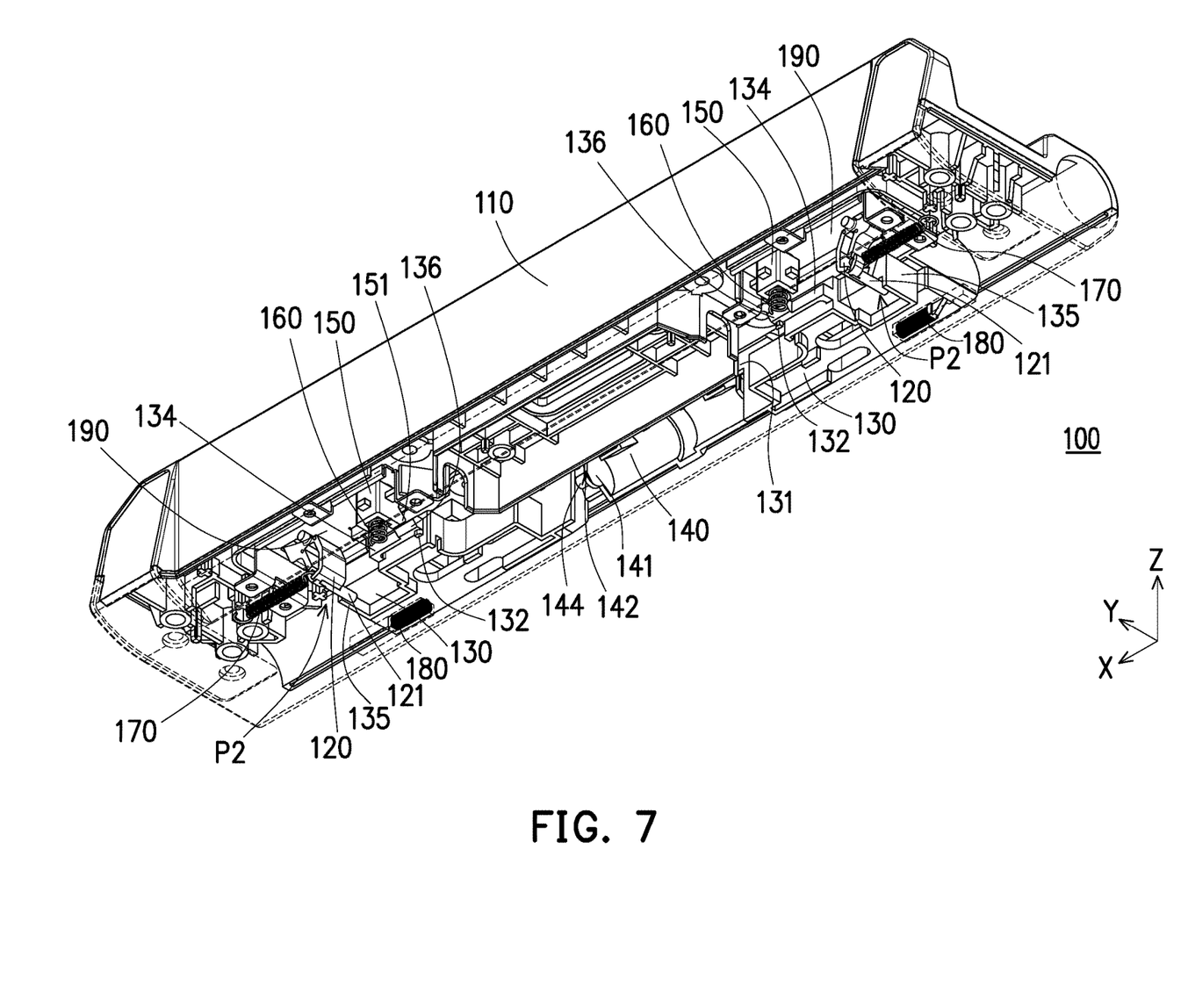
FIG. 7 is a schematic three-dimensional view illustrating the locking device depicted in FIG. 3 at another viewing angle.

FIG. 1 is a schematic three-dimensional view illustrating a locking device in a first mode according to an embodiment of the disclosure. FIG. 2 is a schematic three-dimensional view illustrating the locking device depicted in FIG. 1 in a second mode. FIG. 3 is a schematic three-dimensional view illustrating the locking device depicted in FIG. 1 in a third mode. FIG. 4 is a schematic three-dimensional view illustrating the locking device depicted in FIG. 1 in a fourth mode. FIG. 5 is a schematic three-dimensional view illustrating the locking device depicted in FIG. 1 in a fifth mode. FIG. 6 is a schematic three-dimensional view illustrating the locking device depicted in FIG. 1 at another viewing angle. FIG. 7 is a schematic three-dimensional view illustrating the locking device depicted in FIG. 3 at another viewing angle. Rectangular coordinates X-Y-Z are provided for better understanding. With reference to FIG. 1 and FIG. 6, a locking device 100 may be applied to a docking device and become a part of the docking device for installing a tablet computer. The locking device 100 includes a base 110, a hook 120, a sliding member 130, a knob 140, an actuating member 150, a first position restoring member 160, a second position restoring member 170, a third position restoring member 180, and a cover plate 190.

In this embodiment, the number of the hook 120, the sliding member 130, the actuating member 150, the first position restoring member 160, the second position restoring member 170, the third position restoring member 180, and the cover plate 190 is two, and these components are designed to be bilaterally symmetrical, which should however not be construed as limitations in the disclosure. For the convenience of explanation, the structure depicted on the left side in FIG. 1 is taken as an example.

Specifically, the hook 120 is pivoted to the base 110 around a y axis to rotate along the y axis between an engaging position P1 shown in FIG. 2 and FIG. 4 and a releasing position P2 shown in FIG. 3 and FIG. 5. The second position restoring member 170 is disposed in the base 110, and two ends of the second position restoring member 170 are respectively connected to the base 110 and the hook 120. Here, the second position restoring member 170 may be implemented in form of an expansion spring, so as to constantly drive the hook 120 to rotate along a positive direction of the y axis and to be transported to the engaging position P1. However, the type of the second position restoring member 170 is not limited to the expansion spring, and those skilled in the art may select different springs according to the overall structural design of the locking device 100.

Figure 8:
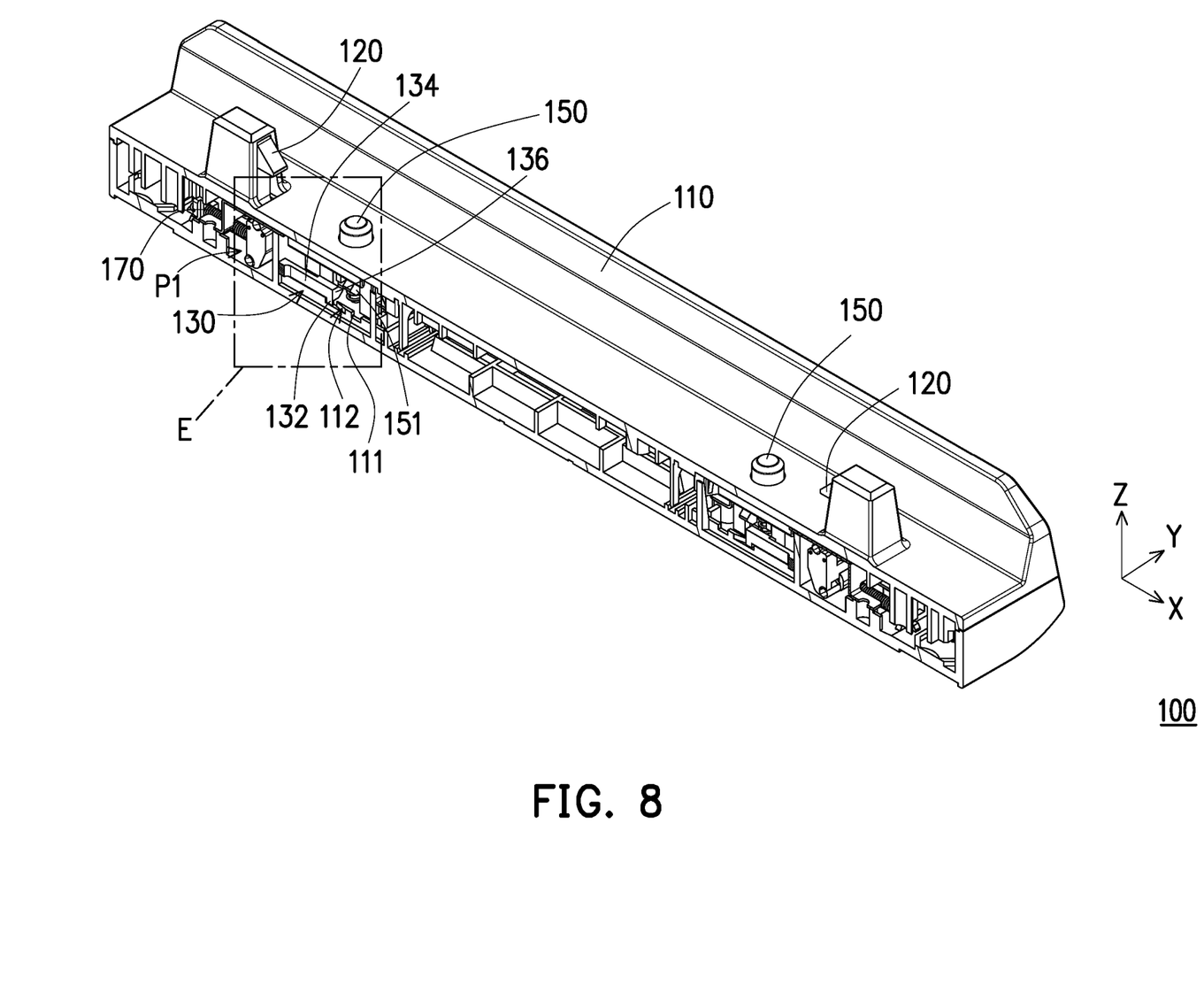
FIG. 8 is a three-dimensional cross-sectional view illustrating the locking device depicted in FIG. 2.
Figure 9:
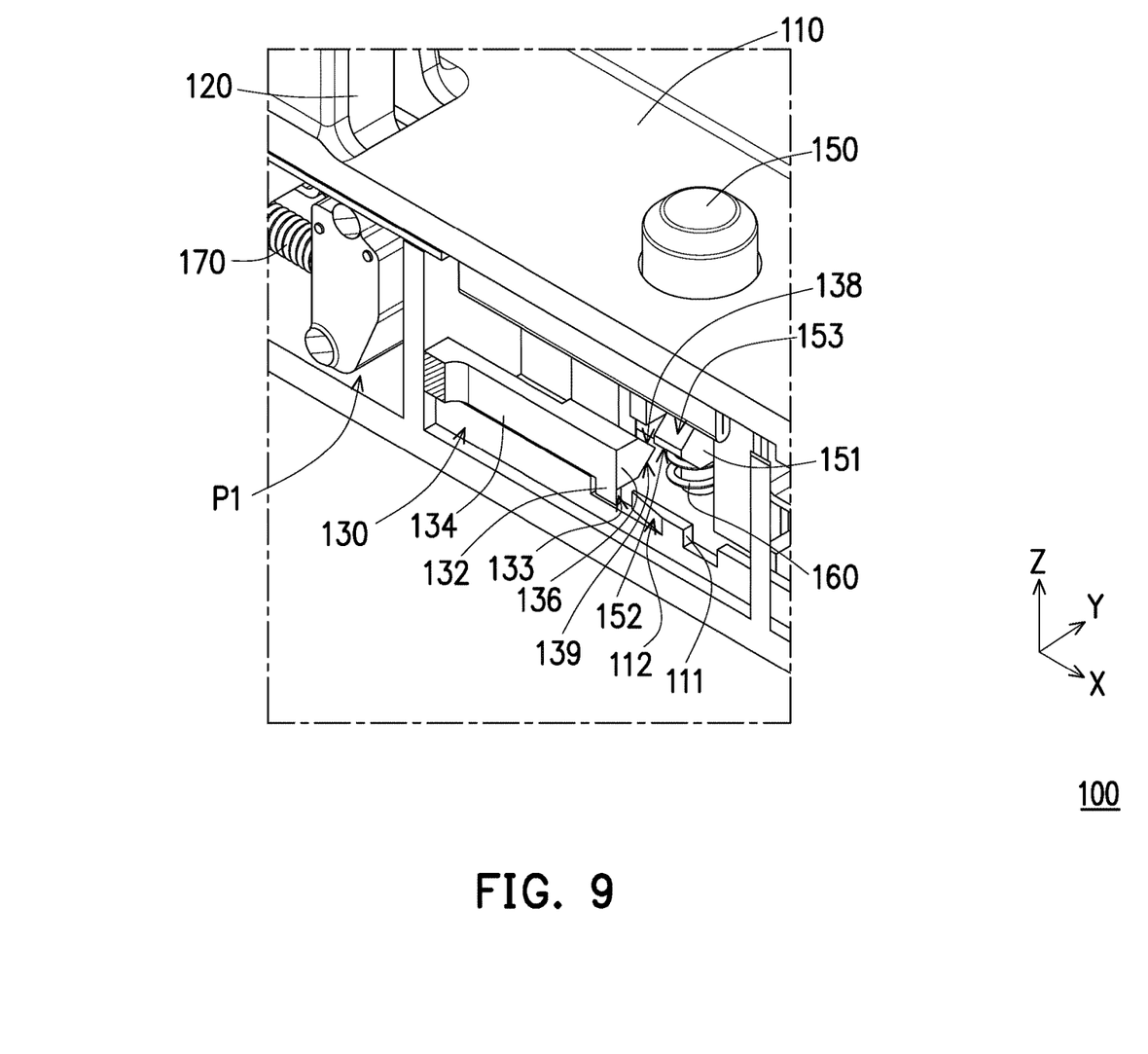
FIG. 9 is a schematic enlarged view illustrating a region E of the locking device depicted in FIG. 8.
Figure 10:
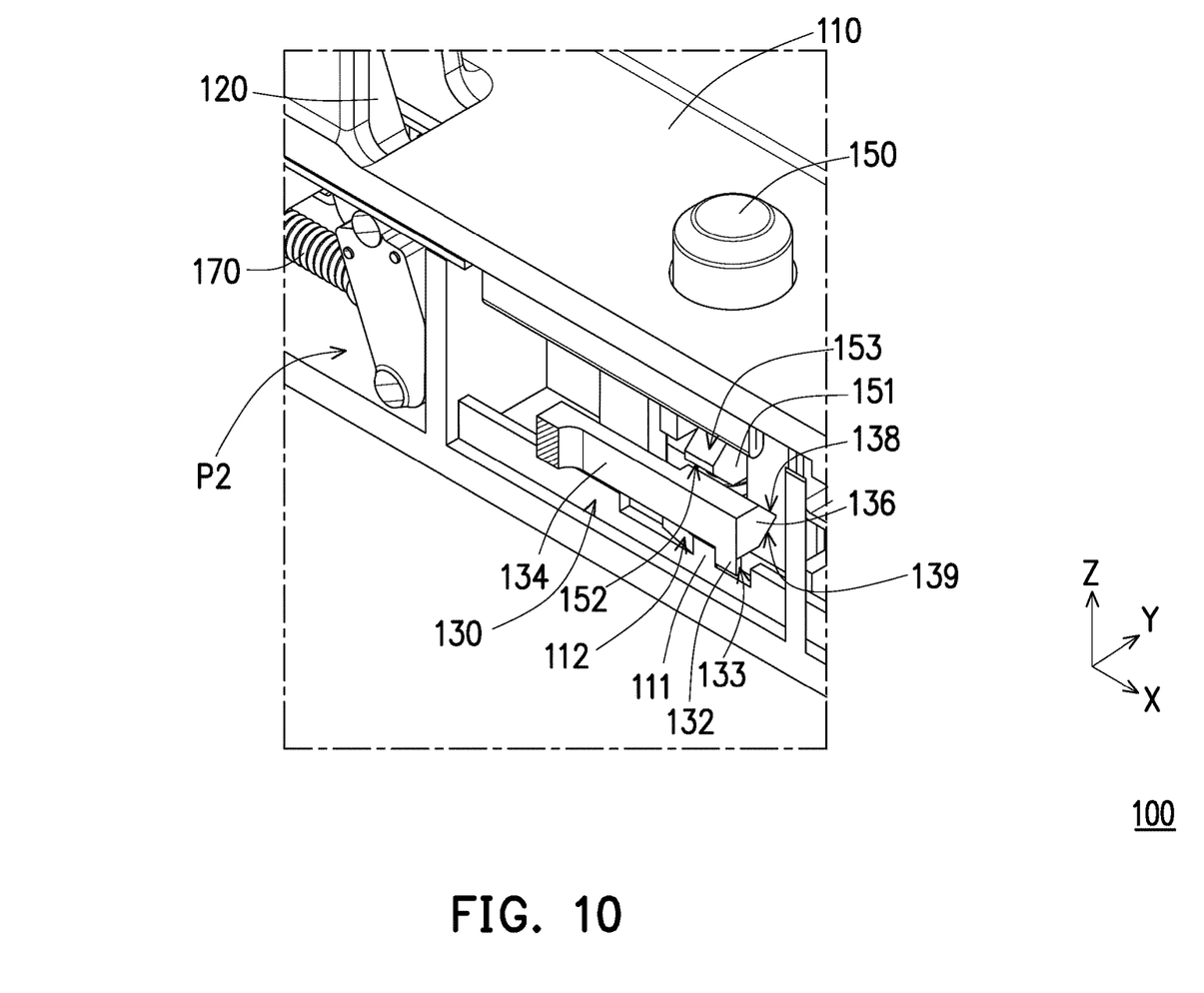
FIG. 10 is a schematic partial cross-sectional view illustrating the locking device depicted in FIG. 9 in the third mode.

FIG. 8 is a three-dimensional cross-sectional view illustrating the locking device depicted in FIG. 2. FIG. 9 is a schematic enlarged view illustrating a region E of the locking device depicted in FIG. 8. With reference to FIG. 2, the sliding member 130 is slidably disposed at the base 110 along an x-axis direction, so as to slide back and forth relative to the base 110 along the x-axis direction as shown in FIG. 2 and FIG. 3, and then the sliding member 130 is disengaged from the hook 120 as shown in FIG. 6 or drives the hook 120 to be transported to the releasing position P2 shown in FIG. 2. Besides, the sliding member 130 is configured to be locked to the base 110 as shown in FIG. 10 to maintain the hook 120 at the releasing position P2 as shown in FIG. 2. The third position restoring member 180 is disposed in the base 110, and two ends of the third position restoring member 180 respectively abut against the base 110 and the sliding member 130. Here, the third position restoring member 180 may be implemented in form of a compression spring to constantly drive the sliding member 130 toward a negative direction of the x axis to be disengaged from the hook 120. However, the type of the third position restoring member 180 is not limited to the compression spring, and those skilled in the art may select different springs according to the overall structural design of the locking device 100.

Figure 11:
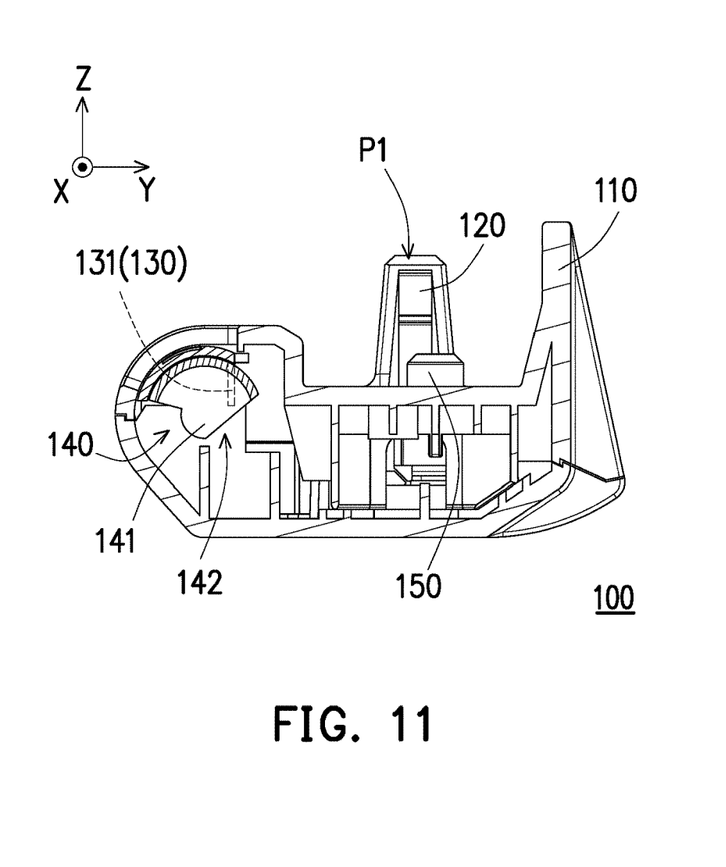
FIG. 11 is a schematic cross-sectional view illustrating the locking device depicted in FIG. 1 along a sectional line A-A.
Figure 12:
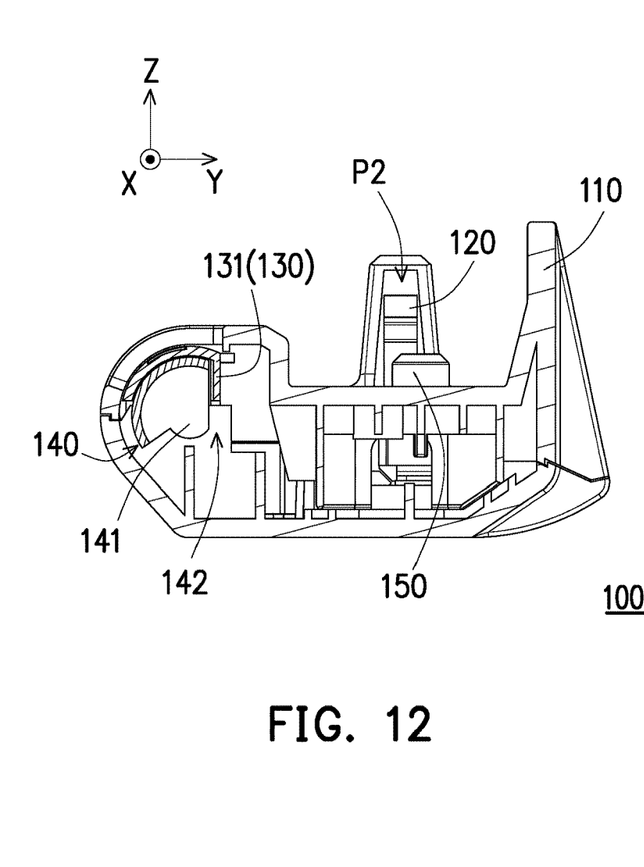
FIG. 12 is a schematic cross-sectional view illustrating the locking device depicted in FIG. 2 along a sectional line B-B.

FIG. 11 is a schematic cross-sectional view illustrating the locking device depicted in FIG. 1 along a sectional line A-A. FIG. 12 is a schematic cross-sectional view illustrating the locking device depicted in FIG. 2 along a sectional line B-B. With reference to FIG. 1, FIG. 2, FIG. 11, and FIG. 12, the knob 140 is pivoted to the base 110 around the x axis, so as to rotate along the x axis relative to the base 110 as shown in FIG. 1 and FIG. 2. The knob 140 further blocks the sliding member 130 as shown in FIG. 11 or allows the sliding member 130 to slide back and forth relative to the base 110 along the x-axis direction as shown in FIG. 12.

Figure 13:
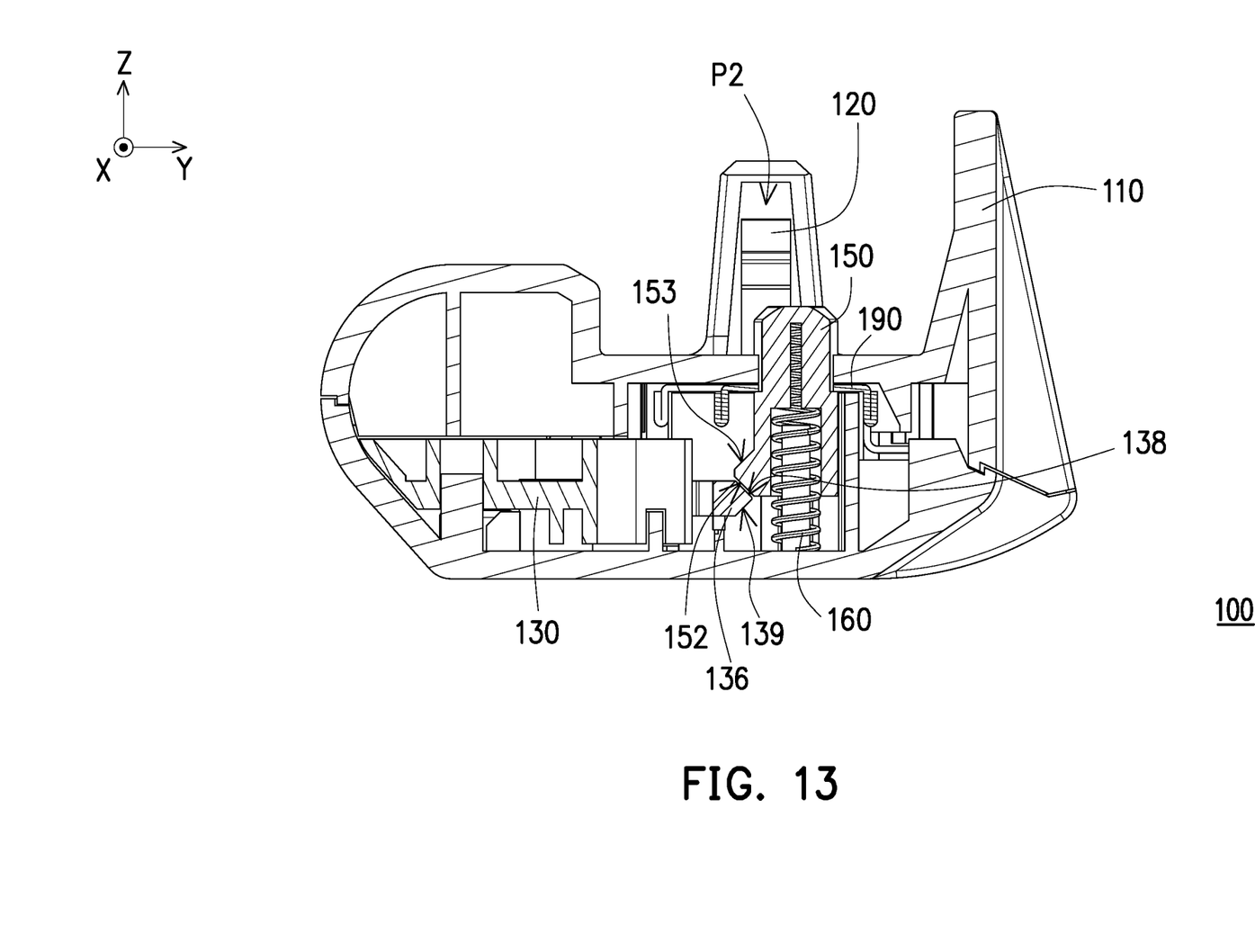
FIG. 13 is a schematic cross-sectional view illustrating the locking device depicted in FIG. 3 along a sectional line C-C.
Figure 14:
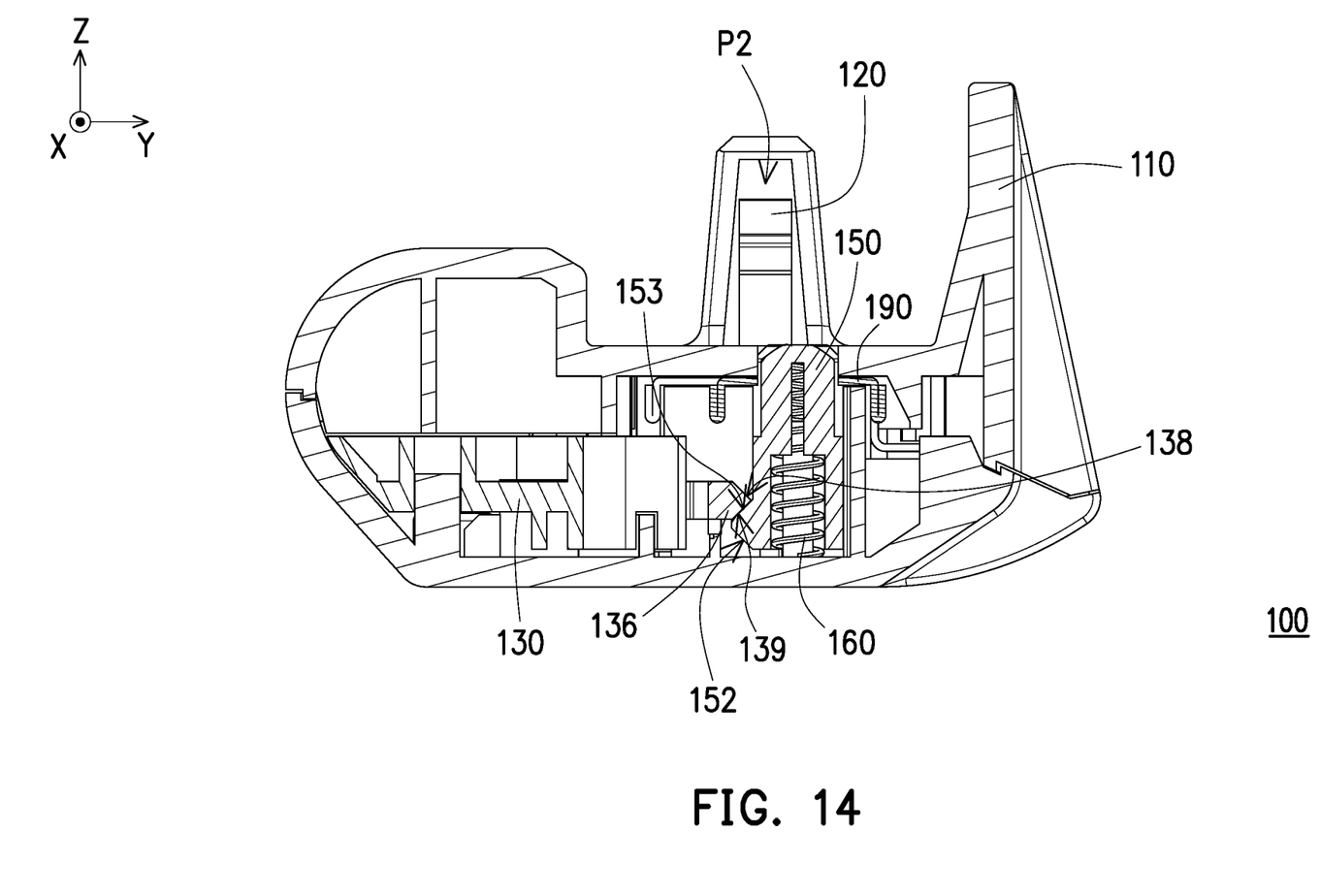
FIG. 14 is a schematic cross-sectional view illustrating the locking device depicted in FIG. 5 along a sectional line D-D.

FIG. 13 is a schematic cross-sectional view illustrating the locking device depicted in FIG. 3 along a sectional line C-C. FIG. 14 is a schematic cross-sectional view illustrating the locking device depicted in FIG. 5 along a sectional line D-D. With reference to FIG. 3, FIG. 5, FIG. 13, and FIG. 14, the actuating member 150 is slidably disposed at the base 110 along a z-axis direction, and the actuating member 150 is configured to receive a force to slide back and forth relative to the base 110 along the z-axis direction, thereby driving the sliding member 130 in FIG. 10 to be disengaged from the base 110, so that the sliding member 130 moves toward the negative direction of the x axis as shown in FIG. 9. Besides, the sliding member 130 is disengaged from the hook 120 as shown in FIG. 6 to allow the hook 120 to be transported to the engaging position P1 as shown in FIG. 4. The first position restoring member 160 is disposed in the base 110, and two ends of the first position restoring member 160 respectively abut against the base 110 and the actuating member 150. Here, the first position restoring member 160 may be implemented in form of a compression spring to constantly drive the actuating member 150 to move toward a positive direction of the z axis and away from the base 110 and protrude from the base 110. However, the type of the first position restoring member 160 is not limited to the compression spring, and those skilled in the art may select different springs according to the overall structural design of the locking device 100.

With reference to FIG. 1, the cover plate 190 is disposed on the base 110, and the hook 120 and the actuating member 150 are installed at the base 110, wherein the hook 120 and the actuating member 150 pass through the cover plate 190.

Thereby, according to the order shown from FIG. 3 to FIG. 4, when a user operates the sliding member 130 to lock the sliding member 130 to the base 110, the hook 120 is maintained at the releasing position P2. The user exerts a force to the actuating member 150; for instance, the user installs the tablet computer onto the base 110, so that the tablet computer pushes the actuating member 150 to move in a negative direction of the z axis, whereby the actuating member 150 drives the sliding member 130 to be disengaged from the base 110. The hook 120 is then transported to the engaging position P1, which is convenient for installing the tablet computer. According to the order shown from FIG. 5 to FIG. 2, when the user operates the sliding member 130 to lock the sliding member 130 to the base 110, the hook 120 is maintained at the releasing position P2. The user exerts a force to the actuating member 150; for instance, the user disassembles the tablet computer from the base 110, so as to move the actuating member 150 toward the positive direction of the z axis through disassembling the tablet computer, whereby the actuating member 150 drives the sliding member 130 to be disengaged from the base 110. The hook 120 then returns to engaging position P1. In view of the above, during installation of the tablet computer or disassembly of the tablet computer, the user may complete the installation or disassembly with use of one single hand, thus ensuring the convenience of use.

With reference to FIG. 6, FIG. 7, FIG. 11, and FIG. 12, the knob 140 has a stopper part 141, an opening 142, a second operating part 143, and two rotating shafts 144, wherein the knob 140 is pivoted to the base 110 through the two rotating shafts 144. The sliding member 130 has a first abutting part 131. The second operating part 143 of the knob 140 is exposed outside the base 110 for the user to exert a force to the second operating part 143, whereby the knob 140 may rotate along the x axis back and forth after receiving the force.

With reference to FIG. 1, FIG. 6, and FIG. 11, in said mode, the stopper part 141 is located on a moving path of the first abutting part 131 of the sliding member 130; therefore, the first abutting part 131 abuts against the stopper part 141 to prevent the sliding member 130 from sliding relatively, and the opening 142 is misaligned from the first abutting part 131, so that the first abutting part 131 cannot pass through the opening 142, which may prevent the sliding member 130 from being incorrectly operated. Alternatively, with reference to FIG. 2, FIG. 7, and FIG. 12, the user may exert a force to the second operating part 143, so that the knob 140 in FIG. 11 is allowed to rotate along a positive direction of the x axis and is transported to the position shown in FIG. 12. Thereby, the stopper part 141 is located outside the moving path of the first abutting part 131 and is not able to stop the first abutting part 131. Besides, the opening 142 is aligned to the first abutting part 131 to allow the first abutting part 131 to slide relative to the base 110 and pass through the opening 142 toward the positive direction of the x axis.

With reference to FIG. 1, FIG. 6, and FIG. 11, the sliding member 130 has a second abutting part 135 and a first operating part 137, and the hook 120 has a first actuated part 121. In this mode, the second abutting part 135 of the sliding member 130 is disengaged from the first actuated part 121 of the hook 120. In addition, the first operating part 137 is exposed outside the base 110 for the user to exert a force to the first operating part 137, so that the sliding member 130 may slide back and forth along the x-axis direction after receiving the force. With reference to FIG. 7, after the user exerts a force to have the sliding member 130 slide toward the positive direction of the x axis, the third position restoring member 180 is compressed, whereby elastic potential energy is accumulated. In addition, since the first actuated part 121 is located on a moving path of the second abutting part 135, while the second abutting part 135 is sliding toward the positive direction of the x axis, the second abutting part 135 is allowed to drive the first actuated part 121, the hook 120 is further driven to rotate along a negative direction of the y axis and is transported to the releasing position P2, and the hook 120 drives the second position restoring member 170 to be stretched to accumulate the elastic potential energy.

With reference to FIG. 2, FIG. 8, and FIG. 9, the base 110 has a first engaging part 111 and a first guiding part 112. The sliding member 130 has an elastic arm 134, a second engaging part 132 corresponding to the first engaging part 111, and a second guiding part 133 corresponding to the first guiding part 112. Here, the second engaging part 132 is connected to the elastic arm 134, the second guiding part 133 is located on the second engaging part 132, and the elastic arm 134 is configured to generate elastic deformation. For instance, the first guiding part 112 is an inclined plane, and the second guiding part 133 is an arc plane. Here, the so-called inclined plane of the first guiding part 112 refers to a single inclined plane simultaneously facing the negative direction of the x axis and the negative direction of the y axis. Further, with reference to FIG. 10, the second guiding part 133 slides on the first guiding part 112, so that the second engaging part 132 is allowed to move toward the negative direction of the y axis; until the sliding member 130 is moved to a certain position, the second engaging part 132 is locked to the first engaging part is stuck 111, and the hook 120 is maintained at the releasing position P2.

With reference to FIG. 9, FIG. 10, FIG. 13, and FIG. 14, the actuating member 150 has a pushing part 151, a first pushing inclined plane 152, and a second pushing inclined plane 153; here, the first pushing inclined plane 152 is a single inclined plane simultaneously facing both the negative direction of the y axis and the negative direction of the z axis, and the second pushing inclined plane 153 is a single inclined plane simultaneously facing the negative direction of the y axis and the positive direction of the z axis. The sliding member 130 has a second actuated part 136 corresponding to the pushing part 151, a first actuated inclined plane 138 corresponding to the first pushing inclined plane 152, and a second actuated inclined plane 139 corresponding to the second pushing inclined plane 153. Here, the first actuated inclined plane 138 is a single inclined plane simultaneously facing the positive direction of the y axis and the positive direction of the z axis, and the second actuated inclined plane 139 is a single inclined plane simultaneously facing the positive direction of the y axis and the negative direction of the z axis. Accordingly, during the reciprocating movement of the actuating member 150 along the z-axis direction, the second actuated part 136 may be pushed by pushing the pushing part 151, thereby causing the elastic arm 134 to generate elastic deformation. As such, the second engaging part 132 is allowed to move toward the negative direction of the y axis and is disengaged from the first engaging part 111.

Further, with reference to FIG. 6, after the second engaging part 132 is disengaged from the first engaging part 111, the third position restoring member 180 releases the accumulated elastic potential energy and drives the sliding member 130 to slide toward the negative direction of the x axis, whereby the second abutting part 135 of the sliding member 130 is disengaged from the first actuated part 121 of the hook 120, and the second position restoring member 170 releases the accumulated elastic potential energy to drive the hook 120 to rotate along the positive direction of the y axis and to be transported to the engaging position P1.

With reference to FIG. 3 and FIG. 13, the tablet computer may move toward the negative direction of the z axis to be installed at the base 110. As the tablet computer moves toward the negative direction of the z axis, the actuating member 150 is also pushed by the tablet computer to move toward the negative direction of the z axis. During such a process, the first position restoring member 160 is compressed to accumulate the elastic potential energy. The first pushing inclined plane 152 and the first actuated inclined plane 138 collectively move the pushing part 151 toward the negative direction of the y axis, thereby disengaging the sliding member 130 from the base 110.

With reference to FIG. 5 and FIG. 14, the tablet computer may move toward the positive direction of the z axis to be disassembled from the base 110. As the tablet computer moves toward the positive direction of the z axis, the accumulated elastic potential energy of the first position restoring member 160 is released, and the actuating member 150 is thus pushed by the first position restoring member 160 to move toward the positive direction of the z axis. During such a process, the second pushing inclined plane 153 and the second actuated inclined plane 139 collectively move the pushing part 151 toward the negative direction of the y axis, thereby disengaging the sliding member 130 from the base 110.

All of the above operations may be completed by the user with use of one single hand, and therefore the locking device 100 is characterized by convenience of use and is labor-saving.

To sum up, in the locking device provided in one or more embodiments of the disclosure, the hook is pivoted to the base to move between the engaging position and the releasing position, the sliding member is slidably disposed at the base to slide relative to the base, so as to be disengaged from the hook or drive the hook to be transported to the releasing position, and the sliding member is configured to be locked to the base to maintain the hook at the releasing position. The knob is pivoted to the base to rotate relative to the base and block the sliding member from sliding or allow the sliding member to slide relative to the base. The actuating member is slidably disposed at the base, and the actuating member is configured to receive a force to slide relative to the base and drive the sliding member to be disengaged from the base, so that the sliding member is moved and disengaged from the hook to allow the hook to be configured for being transported to the engaging position. When the sliding member is locked to the base, the hook stays at the releasing position, and the user may exert a force to the actuating member, so as to allow the actuating member to drive the sliding member to be disengaged from the base and further allow the hook to be transported to the engaging position. Thereby, the tablet computer may be installed or disassembled with ease, and such an installation or disassembly be done by the user with use of one single hand, thus ensuring the convenience of use.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:
1. A locking device, comprising:
a base;
a hook, pivoted to the base to move between an engaging position and a releasing position;
a sliding member, slidably disposed at the base to slide relative to the base, so that the sliding member is disengaged from the hook or drives the hook to be transported to the releasing position and is configured to be locked to the base to maintain the hook at the releasing position;

a knob, pivoted to the base to rotate relative to the base and block the sliding member from sliding or allow the sliding member to slide relative to the base; and an actuating member, slidably disposed at the base and configured to receive a force to slide relative to the base and drive the sliding member to be disengaged from the base, so that the sliding member moves and is disengaged from the hook to allow the hook to be configured for being transported to the engaging position.

2. The locking device according to claim 1, further comprising:
a first position restoring member, disposed in the base, both ends of the first position restoring member respectively abutting against the base and the actuating member.

3. The locking device according to claim 2, wherein the first position restoring member constantly drives the actuating member to move away from the base.

4. The locking device according to claim 1, further comprising:
a second position restoring member, disposed in the base, both ends of the second position restoring member being respectively connected to the base and the hook.

5. The locking device according to claim 4, wherein the second position restoring member constantly drives the hook to move to the engaging position.

6. The locking device according to claim 1, further comprising:
a third position restoring member, disposed in the base, both ends of the third position restoring member respectively abutting against the base and the sliding member.

7. The locking device according to claim 6, wherein the third position restoring member constantly drives the sliding member to move to be disengaged from the hook.

8. The locking device according to claim 1, wherein the knob has a stopper part, and the knob is configured to rotate relative to the base, so that the stopper part is located on a moving path of the sliding member to prevent the sliding member from relatively sliding or being located outside the moving path of the sliding member and to allow the sliding member to slide relative to the base.

9. The locking device according to claim 1, wherein the knob has an opening, and the knob is configured to rotate relative to the base, so that the opening is misaligned from the sliding member, and the sliding member is prevented from passing through the opening, whereby the sliding member is prevented from sliding relatively, or the opening is allowed to be aligned to the sliding member, so that the sliding member is allowed to pass through the opening and slide relative to the base.

10. The locking device according to claim 1, wherein the sliding member has a first abutting part, and the first abutting part is configured to abut against the knob, so that the sliding member is restricted from relatively sliding or configured to pass through the knob, whereby the sliding member is allowed to slide relative to the base.

11. The locking device according to claim 1, wherein the sliding member has a second abutting part, and the second abutting part is configured to be disengaged from the hook or drive the hook to the releasing position.

12. The locking device according to claim 1, wherein the hook has a first actuated part, and the first actuated part is configured to be driven by the sliding member to transport the hook to the releasing position.

13. The locking device according to claim 1, wherein the base has a first engaging part, the sliding member has a second engaging part corresponding to the first engaging part, and the second engaging part is configured to be locked to the first engaging part, so that the sliding member is allowed to maintain the hook at the releasing position.

14. The locking device according to claim 1, wherein the base has a first guiding part, the sliding member has a second guiding part corresponding to the first guiding part, and the first guiding part is configured to guide the second guiding part, so that the sliding member is configured to be locked to the base.

15. The locking device according to claim 1, wherein the sliding member has an elastic arm, and the elastic arm is configured to be guided by the base, so that the sliding member is engaged with the base or pushed by the actuating member to disengage the sliding member from the base.

16. The locking device according to claim 1, wherein the actuating member has a pushing part, the sliding member has a second actuated part corresponding to the pushing part, and the actuating member is configured to slide relative to the base, so that the pushing part is allowed to push the second actuated part to disengage the sliding member from the base.

* * * * *